(12) United States Patent
Ponath et al.

(10) Patent No.: US 12,130,191 B2
(45) Date of Patent: Oct. 29, 2024

(54) PRESSURE MEASURING UNIT FOR MEASURING A PRESSURE

(71) Applicant: Endress+Hauser SE+Co. KG, Maulburg (DE)

(72) Inventors: Nils Ponath, Lörrach (DE); Armin Rupp, Weil am Rhein (DE); Dirk Lill, Freiburg (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 144 days.

(21) Appl. No.: 18/042,363

(22) PCT Filed: Jul. 16, 2021

(86) PCT No.: PCT/EP2021/070005
§ 371 (c)(1),
(2) Date: Feb. 21, 2023

(87) PCT Pub. No.: WO2022/037864
PCT Pub. Date: Feb. 24, 2022

(65) Prior Publication Data
US 2023/0314253 A1    Oct. 5, 2023

(30) Foreign Application Priority Data
Aug. 21, 2020   (DE) ...................... 10 2020 121 981.4

(51) Int. Cl.
*G01D 11/24* (2006.01)
*G01L 19/06* (2006.01)
*G01L 19/14* (2006.01)

(52) U.S. Cl.
CPC ........ *G01L 19/0672* (2013.01); *G01D 11/245* (2013.01); *G01L 19/147* (2013.01)

(58) Field of Classification Search
CPC .. G01L 19/0672; G01L 19/147; G01D 11/245
See application file for complete search history.

(56) References Cited

U.S. PATENT DOCUMENTS 7,448,274 B2 * 11/2008 Drewes ................. G01L 19/003
                                                73/715
7,607,353 B2 * 10/2009 Kopp ..................... G01L 19/148
                                                73/706

(Continued)

FOREIGN PATENT DOCUMENTS

| DE | 10255279 A1 | 6/2004 |
| DE | 102012023677 A1 | 6/2014 |
| DE | 102019127315 A1 | 4/2021 |

*Primary Examiner* — Jamel E Williams
(74) *Attorney, Agent, or Firm* — Mark A. Logan; Endress+Hauser (USA) Holding, Inc.

(57) ABSTRACT

A pressure measuring unit includes a pressure measuring cell; a rotationally symmetrical sensor bushing into which the pressure measuring cell is inserted; a rotationally symmetrical process connection having, at one end, an inwardly extending encircling stop surface intended for the sensor bushing and, at another end, an opening for receiving the sensor bushing; a ring-like process seal between the sensor bushing and the stop surface of the process connection in order to thus prevent an ingress of the process medium into the pressure measuring unit; wherein the stop surface of the process connection and/or a counterpart stop surface, which in the installed state is directed toward the stop surface, of the sensor bushing have multiple individually formed webs configured such that the process seal is not extruded into the openings.

10 Claims, 5 Drawing Sheets

(56) References Cited

U.S. PATENT DOCUMENTS

| | | | | |
|---|---|---|---|---|
| 8,925,388 | B2* | 1/2015 | Hugel | G01L 9/0075 |
| | | | | 73/756 |
| 2009/0211363 | A1* | 8/2009 | Drewes | G01L 19/147 |
| | | | | 73/723 |
| 2011/0290033 | A1* | 12/2011 | Flogel | G01L 19/14 |
| | | | | 73/753 |
| 2013/0086990 | A1 | 4/2013 | Hugel | |
| 2016/0003700 | A1* | 1/2016 | Jacob | G01L 19/147 |
| | | | | 73/431 |
| 2020/0137912 | A1* | 4/2020 | Pfeifer | H01R 13/5804 |

* cited by examiner

PRESSURE MEASURING UNIT FOR MEASURING A PRESSURE

CROSS-REFERENCE TO RELATED APPLICATIONS

The present application is related to and claims the priority benefit of DPMA Patent Application No. 10 2020 121 981.4, filed on Aug. 21, 2020, and International Patent Application No. PCT/EP2021/070005, filed on Jul. 16, 2021, the entire contents of which are incorporated herein by reference.

TECHNICAL FIELD

The invention relates to a pressure measuring unit for measuring a pressure.

BACKGROUND

In automation technology, pressure measuring units are frequently used which serve to monitor a process medium. Such pressure measuring units usually consist of a process connector which is used to fix the pressure measuring unit in a measuring point in an automation plant. A pressure measuring cell is inserted into the process connector so as to be flush with the front, i.e., facing the process, and is sealed off from the process by a process seal so that no process medium can escape or enter the housing of the pressure measuring unit.

In hygienic applications, i.e., processes that require a high level of cleanliness, e.g., in the food industry, pharmaceuticals, or biochemistry, the relevant certification bodies, e.g., 3-A or the European Hygienic Equipment Design Group (hereafter also referred to as the EHEDG for short), a recognition of a leaky process seal is prescribed.

One way to detect such a leaking process seal is to use electronic means, e.g., a sensor in the form of an electronic nose, which detects the entry of the process medium into a housing of the pressure measuring unit. Such an approach is described in EP 102 55 279 A1, for example.

A disadvantage of this is that, on the one hand, the sensor has to be integrated into the pressure measuring unit, and, additionally, a corresponding electronics unit for controlling the sensor is required.

SUMMARY

It is therefore an object of the invention to propose a simpler way of monitoring a process seal for leakage.

The object is achieved according to the invention by the pressure measuring unit according to the present disclosure The pressure measuring unit according to the invention for measuring a pressure comprises:
- a pressure measuring cell;
- a rotationally symmetrical sensor bushing into which the pressure measuring cell is inserted;
- a rotationally symmetrical process connector for releasable fastening of the pressure measuring unit to a wall of a measuring point, wherein the process connector at one end has an inwardly-extending circumferential stop surface intended for the sensor bushing, and at another end has an opening for receiving the sensor bushing, wherein, in an installed state, the sensor bushing with the pressure measuring cell is inserted into the process connector through the opening up to the stop surface, so that the pressure measuring cell is introduced into the measuring point so as to be substantially flush with the front;
- a ring-like process seal, that, in a sealing plane between the sensor bushing and the stop surface of the process connector, in a ring-like manner radially encircles and seals in order to prevent the process medium from entering the pressure measuring unit;
- wherein the stop surface of the process connector and/or a counter-stop surface, directed, in the installed state, towards the stop surface, of the sensor bushing have several, individually-formed, webs which are formed in such a way that in the installed state several openings of a defined height and a width defined by the configuration of the webs are formed between the counter-stop surface of the sensor bushing and the stop surface of the process connector, wherein the several openings together form a fluidic path network consisting of several individual fluidic paths running parallel to one another, via which fluidic path network, in the event of a failure of the process seal, the process medium is conducted from the sealing plane at the process seal to at least one opening visible from the outside in the installed state of the pressure measuring unit, wherein the webs are designed in such a way that a sum of the individual cross-sections of the several openings corresponds to a pre-specified minimum cross-section, wherein the defined height and the defined width are used to calculate the individual cross-sections, and wherein the webs are, as a function of the properties of the process seal, designed such that the process seal does not extrude into the openings.

A pressure measuring unit is proposed in which a detection of leaks in the process seal is made possible in that the process medium is guided via an internal fluidic path network from the location of the leakage (in the sealing plane of the process seal between the sensor bushing and the process connector) to a leakage opening which can be easily recognized by an operator/service technician. A leak of the process seal is signaled by the escape of the process medium from the leakage opening. According to the invention, the fluidic path network comprises not just a single path through which the process medium is conducted, but multiple individual paths running parallel to one another, via which the process medium is conducted from the leaky process seal to the leakage opening.

In order to prevent damage to the seal, e.g., by extruding the seal into the openings formed by the formed webs, according to the invention, webs are proposed which are designed such that openings are formed into which the seal can no longer extrude, or at least not to a greater extent. The webs are designed in such a way that a total cross-section which results from the sum of the individual cross-sections of each opening corresponds to a pre-specified minimum cross-section or does not fall below it. The minimum cross-section can be pre-specified, in particular by a standard, especially a hygiene standard of the European Hygienic Equipment Design Group and/or 3-A. With regard to the width of the openings, the minimum width of each opening is to be used to determine the overall cross-section of the openings, i.e., the width of the opening, to which the process seal is adjacent or on which the process seal rests.

An advantageous embodiment of the pressure measuring unit provides that the webs be designed such that the defined height does not exceed a gap dimension pre-specified for the process seal. This means that the webs are designed in such a way that the defined height of the openings is significantly smaller, i.e., by at least a factor of 15, preferably at least a factor of 20, and very particularly preferably at least a factor of 25 smaller, than a diameter of the process seal.

A further advantageous embodiment of the pressure measuring unit provides that the webs be formed in such a way that the defined height is less than 0.20 mm, preferably less than 0.15 mm, particularly preferably less than 0.10 mm, and most preferably about 0.08 mm.

A further advantageous embodiment of the pressure measuring unit provides that the webs be set back radially from the process seal so that an edge, directed towards the process seal, of the webs has no contact with the not-yet-extruded process seal in the installed state. Due to the setting of the webs back relative to the process seal, the webs are situated in a region into which the seal does not normally extrude.

A further advantageous embodiment of the pressure measuring unit provides that an outer lateral surface of the sensor bushing in a lower partial area, which in the installed state adjoins an inner lateral surface of the process connector, and/or the inner lateral surface of the process connector in a lower partial area, which in the installed state adjoins a or the outer lateral surface of the lower part region of the sensor bushing, has or have several vertical recesses, wherein the several vertical recesses are formed in such a way that the cross-sectional sum of the individual cross-sections of the several vertical recesses corresponds to the pre-specified minimum cross-section. In particular, the embodiment may provide that the sensor bushing in the lower portion and/or the process connector in the lower portion has or have at least one circumferential collection groove for collecting the process medium supplied via the several openings, wherein the at least one collection groove is formed such that a cross-section of the collection groove corresponds to the pre-specified minimum cross-section.

A further advantageous embodiment of the pressure measuring unit provides that the sensor bushing have a circumferential shoulder ring up to which the sensor bushing is inserted into the opening of the process connector in the installed state, and wherein the sensor bushing has a further circumferential collecting groove, preferably directly adjacent to the shoulder ring, which further groove is designed to conduct the process medium to the at least one externally visible leakage opening, wherein the further collecting groove is designed in such a way that a cross-section of the further collecting groove corresponds to the pre-specified minimum cross-section. In particular, the embodiment may provide that the sensor bushing in the lower portion and/or the process connector in the lower portion has or have at least one circumferential collection groove for collecting the process medium supplied via the several openings, wherein the at least one collection groove is formed such that a cross-section of the collection groove corresponds to the pre-specified minimum cross-section.

A further advantageous embodiment of the pressure measuring unit provides that the sensor bushing have a circumferential shoulder ring up to which the sensor bushing is inserted into the opening of the process connector in the installed state, and wherein the sensor bushing has a further circumferential collecting groove, preferably directly adjacent to the shoulder ring, which further groove is designed to conduct the process medium to the at least one externally visible leakage opening (340), wherein the further collecting groove is designed such that a cross-section of the further collecting groove corresponds to the pre-specified minimum cross-section.

A further advantageous embodiment of the pressure measuring unit provides that the at least one leakage opening visible from the outside be formed in such a way that a cross-section or a cross-sectional sum corresponds to the pre-specified minimum cross-section.

A further advantageous embodiment of the pressure measuring unit provides that the at least one leakage opening visible from the outside be formed on a rear side of the process connector, on which the shoulder ring of the sensor bushing is seated in the installed state.

A further advantageous embodiment of the pressure measuring unit provides that the pre-specified minimum cross-section correspond to a pre-specification of a standard, in particular a standard relating to hygiene of the European Hygienic Equipment Design Group and/or 3-A, in particular standard 74-07 of 3-A, published in March 2019. In particular, the embodiment can provide that the pre-specified minimum cross-section have at least 4.0 square millimeters (mm2), preferably at least 4.5 mm2, and particularly preferably at least 4.9 mm2.

BRIEF DESCRIPTION OF THE DRAWINGS

The invention is explained in more detail on the basis of the following drawings. The following are shown.

DETAILED DESCRIPTION

Figure 1:
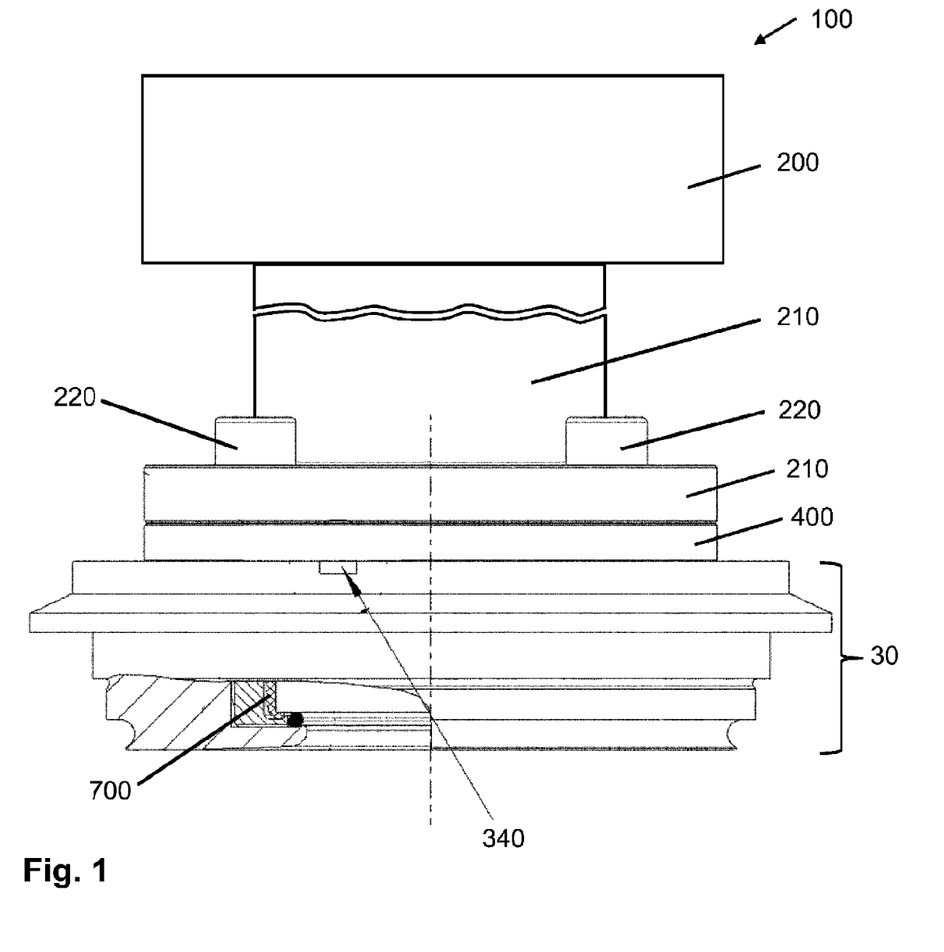
FIG. 1 shows a cross-section through a pressure measuring unit.

FIG. 1 shows a partial section through a pressure measuring unit 100. The pressure measuring unit 100 shown in FIG. 1 comprises several main elements, a rotationally symmetrical sensor bushing 400, a pressure measuring cell 500 inserted into the sensor bushing 400 so as to be flush with the front, a likewise rotationally symmetrical process connector 300 for fastening the pressure measuring unit 100 to a wall of a container or tube containing a process medium, a process seal 600 for the sealing the pressure measuring cell 500, inserted at the front side, with respect to the process, and a housing 200 fastened via a housing adapter 210.

The rotationally symmetrical sensor bushing 400 has a substantially hollow cylindrical body with an outer circumferential shoulder ring 420, a lower part 430 that is adjacent to the shoulder ring 420 and is insertable into the process connector 300, and an upper part 410 adjoining the shoulder ring 420. The lower part 430 of the sensor bushing 400 is designed such that the sensor bushing can be inserted via it into a corresponding opening 433 of the process connector 300. The shoulder ring 420 has several, preferably concentric, bores 421 by which the housing 202 can be connected to the process connector 300 by screws 220. The sensor bushing 400 further has, at an end opposite the housing, an inwardly-extending, radially circumferential stop surface 433. The pressure sensing element 500 is inserted so as to be flush with the front into the sensor bushing 400 via the stop surface 433 and can be positioned with the aid of an additional, rotationally symmetrical centering ring 700.

The centering ring 700 has a substantially rotationally symmetrical, L-shaped cross-section with a short and a long leg piece 710 and 720. The stop surface 433 and the centering ring 700 are matched to one another in such a way that the centering ring 700 rests with the short leg piece 710 on the stop surface 433. Furthermore, the centering ring 700 is designed such that the long leg piece 720 surrounds the outside of the pressure measuring cell 500 so as to be substantially flush, such that the pressure measuring cell 500 is aligned centrally in the sensor bushing 400.

The pressure measuring cell 500 used is preferably a ceramic pressure measuring cell, which has a preferably ceramic base body 510 and a pressure-sensitive, preferably ceramic, measuring diaphragm 520, which moves out of its rest position as a function of a pressure acting on it. The measuring diaphragm 520 and the base body 510 are joined to one another in a pressure-tight manner at their edge by a joint 530, forming a measuring chamber.

To acquire the pressure-dependent displacement and to convert the pressure-dependent displacement into an electrical signal, the pressure measuring cell 500 includes one or more transducer elements. All transducer elements known from the prior art can be considered transducer elements. However, the transducer elements are preferably capacitive transducer elements. Capacitive transducer elements usually have at least one electrode arranged on an inner side of the measuring diaphragm and at least one counter-electrode arranged on an outer side, opposite the inner side and facing the measuring diaphragm, of the base body.

In turn, the rotationally symmetrical process connector 300 has an inwardly-extending, radially circumferential stop surface 310 at an end (front side) 370 facing the process in the installed state, up to which surface the sensor bushing 400 with the pressure measuring cell 500 is inserted into the process connector 300. Here, the pressure measuring cell 500 is introduced into the sensor bushing 400 in such a way that in the installed state the pressure-sensitive measuring diaphragm 520 is directed towards the process (flush with the front).

Figure 2:
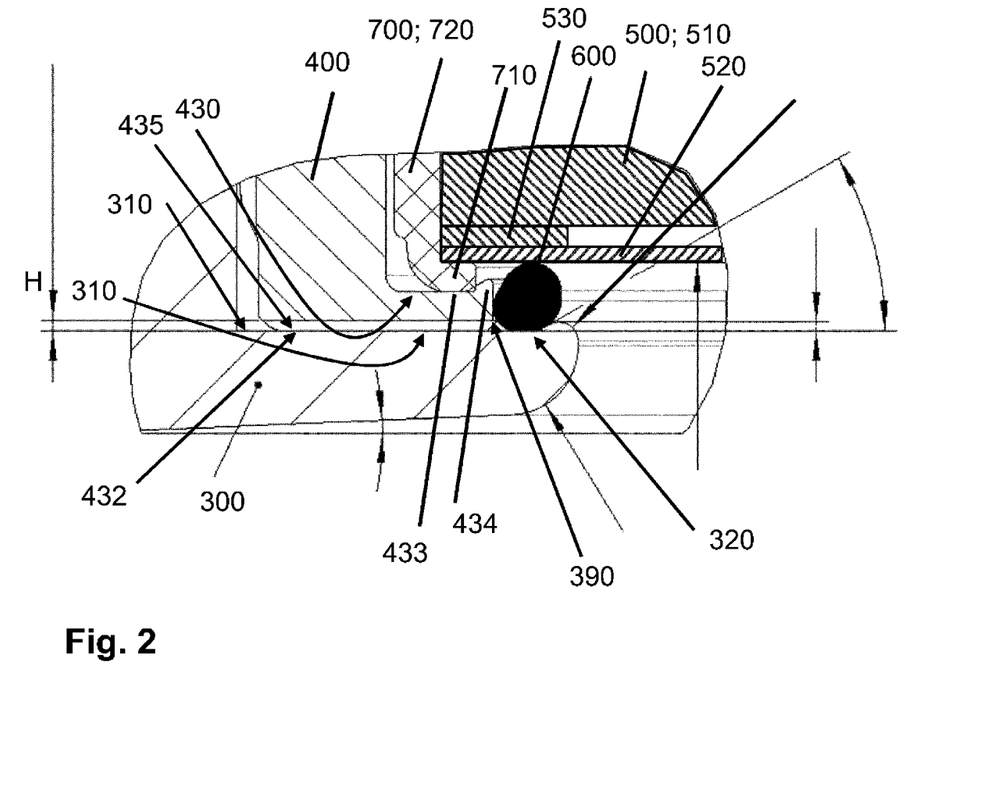
FIG. 2 shows a detail view of the region of the pressure measuring unit in which the sealing of the pressure measuring unit with respect to the process medium is carried out by a process seal.

As shown in FIG. 2, a radially circumferential process seal 600 is introduced between the pressure measuring cell 500 and the process connector 300 in order to prevent the process medium from penetrating between the process connector and the sensor bushing. The process seal 600 can be designed, for example, in the form of an O-ring and consist of a material which is resistant to the process medium. For example, the process seal may comprise ethylene-propylene-diene rubbers (EPDM), fluororubber (FKM), perfluoro rubber (FFKM), nitrile rubber (NBR), or fluoroprene. Such seals, in particular in the form of O-rings, have specific properties that are relevant to the sealing behavior. Examples of such properties are a diameter or cord diameter or a Shore hardness of the seal.

In order to prevent the process seal 600 from slipping, the stop surface of the process connector 310 can be realized such that the stop surface 310 extends further inwards beyond the stop surface of the sensor bushing 433 for the centering ring, and in this region has a geometry 320 for receiving the process seal 600. Furthermore, in order to reduce creepage of the process seal, a nose 434 can be provided on the inner end of the stop surface of the sensor bushing.

Figure 4:
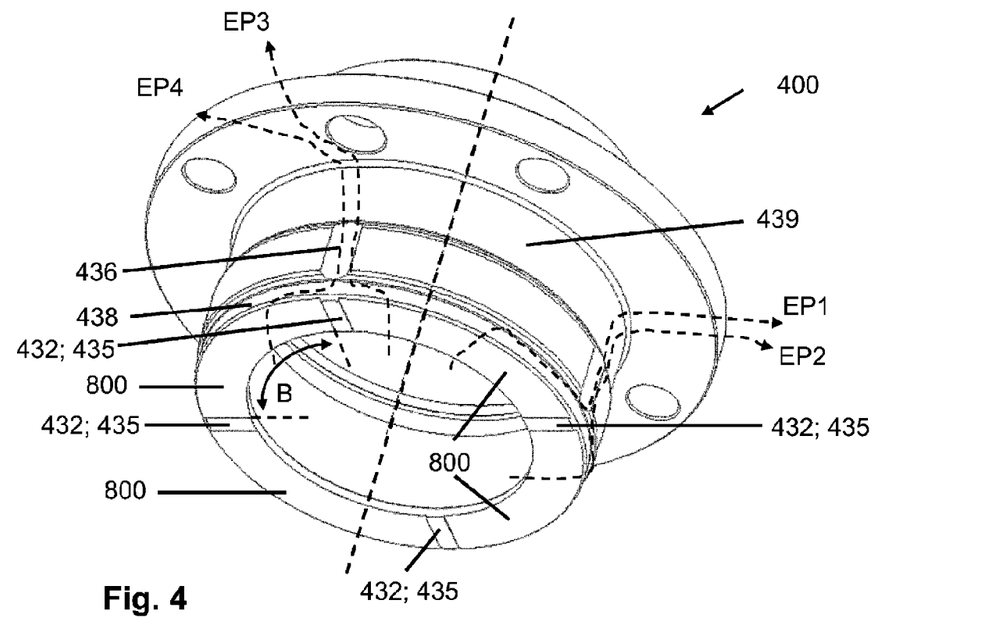
FIG. 4 shows a perspective view of a first embodiment of the sensor bushing.
Figure 5:
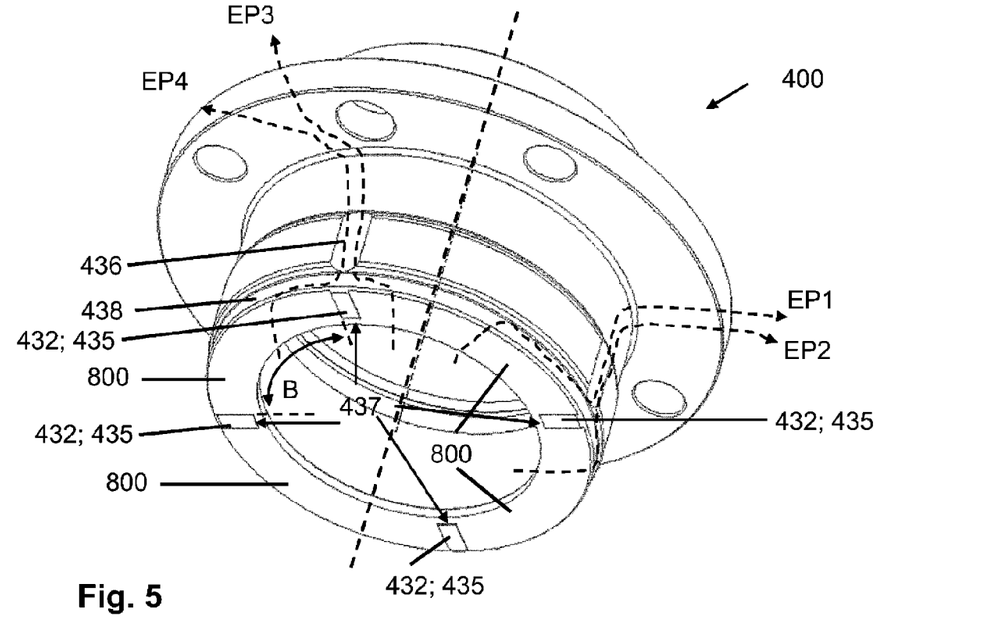
FIG. 5 shows a perspective view of a second embodiment of the sensor bushing.
Figure 6:
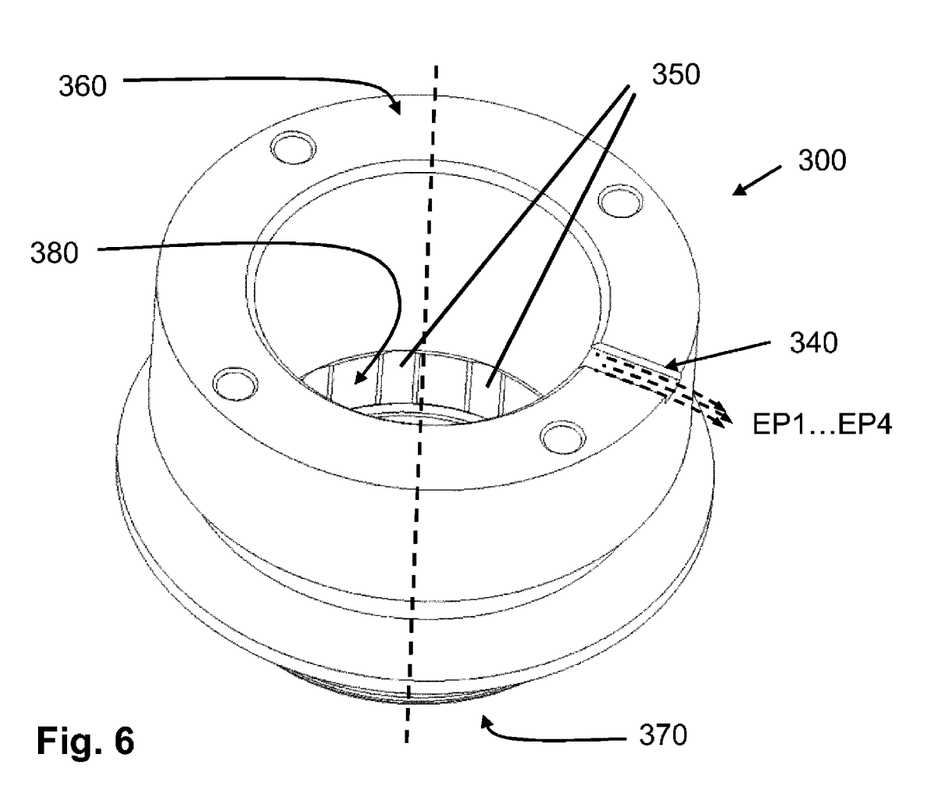
FIG. 6 shows a perspective view of an embodiment of the process connector.

In order to enable recognition of a failure of the process seal 600, a counter-stop surface 432, directed, in the installed state, towards the stop surface, of the sensor bushing 400 has several, individually-formed, webs 435. The webs 435 are designed in such a way that in the installed state several openings 800 result between the counter-stop surface 432 of the sensor bushing 400 and the stop surface 310 of the process connector 300. The openings 800 have a height H and width B defined by the webs. In the embodiments shown in FIGS. 4 and 5, the sensor bushing has four, radially outwardly-extending webs on each end face, which in the installed state result in the formation of four openings 800 via which the process medium is conducted in the event of failure of the process seal 600. FIGS. 4 and 5 show examples of the openings 800 formed by the webs in the installed state.

As a function of the specific characteristics of the process seal 600, the webs 435 are formed so as to make it difficult for the process seal 600 to extrude into the opening. This can be achieved in particular by the defined web height H not exceeding a gap dimension pre-specified for the process seal used in the installed state. The gap dimension is usually pre-specified by the manufacturer of the process seal and is a function in particular of the pressure exerted on the process seal, the diameter or the cord diameter of the process seal, the temperature of the medium at the process seal, and the Shore hardness of the material of the process seal.

For example, for a process pressure of ≤3.5 MPa, the gap dimension for a process seal—in particular, for a process seal formed from an elastomer material, with the exception of process seals coated with polyurethane and FEP/PFA—having a hardness of 70 Shore A can be less than 0.20 mm, preferably less than 0.15 mm, particularly preferably less than 0.10 mm, and most preferably approx. 0.08 mm, so that the defined height of the webs is realized so as to be correspondingly smaller.

In order to avoid damaging the process seal, the webs can further be designed in such a way that an edge of the webs oriented towards the process seal is set back radially as seen from the process seal, so that an edge, directed towards the process seal, of the webs has no contact with the not-yet-extruded process seal in the installed state. The embodiment shown in FIG. 5 shows webs set back in this way. By way of example, a recessed edge is indicated on one web by reference sign 437. Additionally or alternatively, in order to avoid damage to the process seal, the edge of the sensor bushing, which in the installed state is oriented towards the process seal and the stop surface for the sensor bushing of the process connector, can be rounded or chamfered. By way of example, in FIG. 2, the edge is indicated by reference sign 390.

In addition or as an alternative to the webs 435 formed on the counter-stop surface 432 of the sensor bushing 400, corresponding webs can also be formed on the stop surface 310 of the process connector 300.

In the event of a failure of the process seal in the sealing plane between the process connector 300 and the sensor bushing 400, the process medium is conducted through the openings 800 to an outer lateral surface 431 of the lower part 431 of the sensor bushing 400. The lower part 431 of the sensor bushing 400 can have a circumferential lower collecting groove 438 adjoining the end face, in which groove the supplied process medium is collected.

Figure 3:
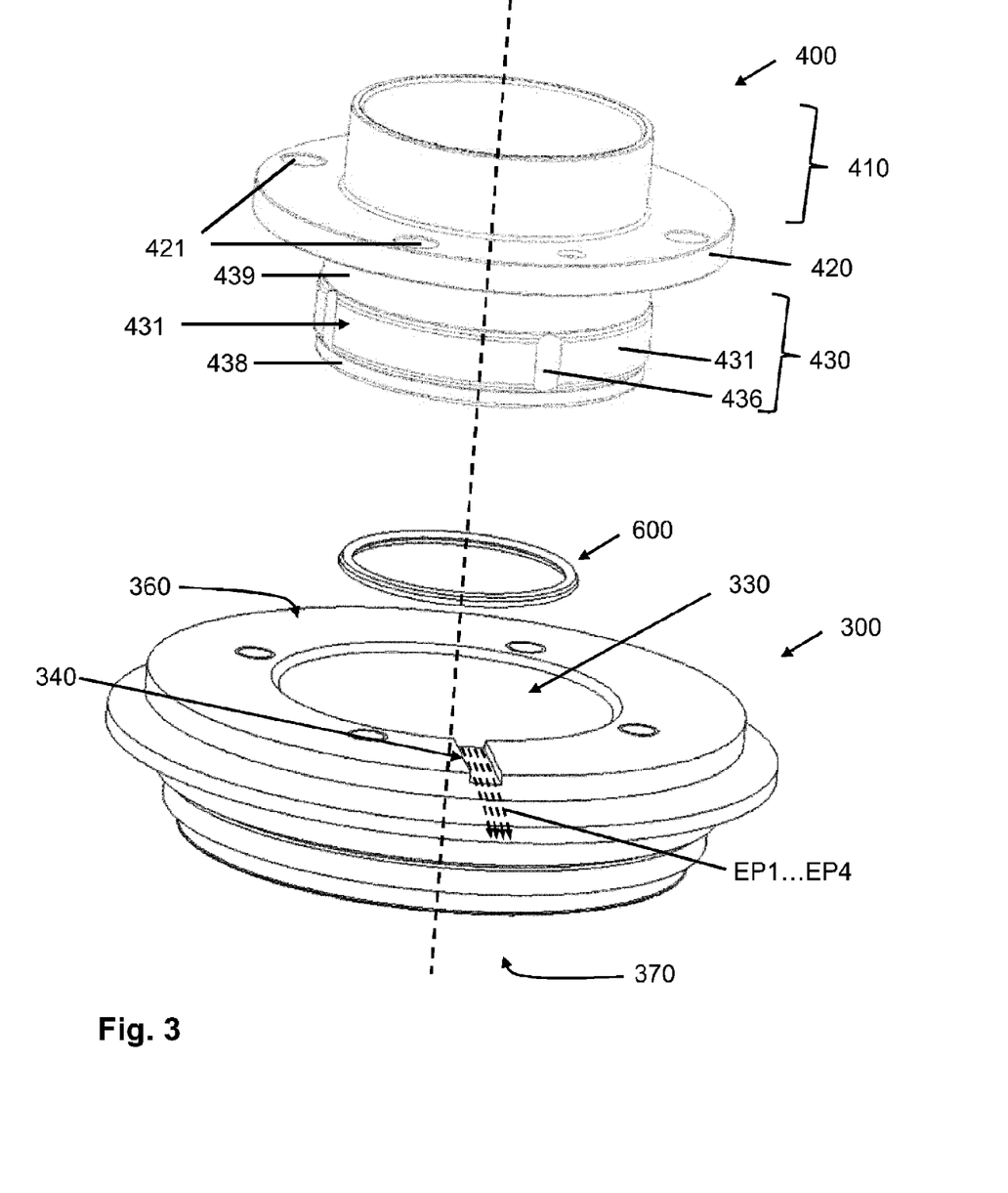
FIG. 3 shows an exploded view of a sensor bushing, the process seal, and a process connector via which the pressure measuring unit is attached at a measuring point.

In order to further conduct the process medium from the lower collecting groove 438 to a leakage opening 340 clearly visible from the outside, the outer lateral surface of the lower part of the sensor bushing 431 can have several vertical recesses 436, as shown in FIG. 3. In addition, the lower part of the sensor bushing 400 can have an upper collecting groove 439 directly adjoining the shoulder ring 420, into which upper groove the vertical recesses 436 open. The vertical recesses 436 are thus formed such that, in the installed state, a fluidic connection results between the lower and the upper collecting grooves 438, 439, via which the process medium coming from the openings 800 is conducted.

Alternatively or in addition to the vertical recesses 436 integrated into the outer lateral surface 431 of the lower portion 430 of the sensor bushing, an inner lateral surface 380 of the process connector 300, which inner lateral surface in the installed state is adjacent to the outer lateral surface 431 of the lower portion 430 of the sensor bushing 400, may include several vertical recesses 350. This can be useful, for example, if the design of the sensor bushing means that it does not have sufficient material in the wall area to be able to realize corresponding vertical recesses.

The vertical recesses 350, 436 may, for example, have been introduced into the corresponding position by milling. Furthermore, these can also be designed, for example, in the form of slots.

As a result of the openings, in combination with the vertical recesses 435, 350, 436 and/or the collecting groove or collecting grooves 438, 439, an internal fluidic path network consisting of several fluidic individual paths is formed, via which a process medium, penetrating due to a defective process seal 600, is conducted from the sealing plane, in which the process seal 600 forms a pressure-tight connection between the stop surface of the process connector and the sensor bushing seated on the stop surface with its end face, to the leakage opening 340 clearly visible from the outside. As shown in FIG. 5, the leakage opening 340 can be formed on a rear side 360, facing away from the front side, of the process connector. Furthermore, instead of a single leakage opening 340, several can also be provided.

To illustrate the individual fluidic paths EP1-EP4, four individual paths are shown by dashed arrows in each of FIGS. 4 and 5, as examples. Each individual path thus comprises an opening 800 which opens into the lower collecting groove 438 adjoining the end face of the sensor bushing 400, a vertical recess 436 which opens the lower collecting groove 438 with an upper collecting groove 439 adjoining the shoulder ring, and the upper collecting groove 439 adjoining the shoulder ring.

The openings 800 or vertical recesses are designed such that a sum of the individual cross-sections $A_{opening\_n}$ of the several openings 800 or of the vertical recesses $A_{recess\_n}$ along the fluidic path corresponds to a pre-specified minimum cross-section, i.e., $\Sigma_{i=1}^{n} A_{opening\_n} = A_{minimum}$ or $\Sigma_{i=1}^{n} A_{recess\_n} = A_{minimum}$.

The individual cross-sections $A_{opening\_n}$ here result from the product of the defined height H and the minimum width B. The width of the respective opening on which the process seal abuts is used as width B. The pre-specified minimum cross-section corresponds to a pre-specification from a standard, in particular a standard (hygiene standard) of the European Hygienic Equipment Design Group (EHEDG) and/or 3-A. In particular, the pre-specified minimum cross-section corresponds to the standard 74-07, published in March 2019. For example, the pre-specified minimum cross-section can have at least 4.9 square millimeters (mm2), preferably at least 5 square millimeters (mm2), and particularly preferably at least 7.2 square millimeters (mm2).

The invention claimed is:

1. A pressure measuring unit, comprising:
   a pressure measuring cell;
   a rotationally symmetrical sensor bushing into which the pressure measuring cell is inserted;
   a rotationally symmetrical process connector for releasable fastening of the pressure measuring unit to a wall of a measuring point, wherein the process connector at one end has an inwardly-extending circumferential stop surface which is intended for the sensor bushing and at another end has an opening for receiving the sensor bushing, wherein, in an installed state, the sensor bushing with the pressure measuring cell is inserted into the process connector through the opening up to the stop surface so that the pressure measuring cell is introduced into the measuring point so as to be flush with a front of the process connector; and
   a ring-like process seal that, in a sealing plane between the sensor bushing and the stop surface of the process connector, in a ring-like manner radially encircles and seals in order to prevent the process medium from penetrating into the pressure measuring unit,
   wherein the stop surface of the process connector and/or a counter-stop surface, directed, in the installed state, towards the stop surface, of the sensor bushing have several, individually-formed, webs designed such that, in the installed state between the counter-stop surface of the sensor bushing and the stop surface of the process connector, several openings form having a defined height and a width defined by the configuration of the webs, wherein the several openings together form a fluidic path network made up of several individual fluidic paths running parallel to one another, wherein in the event of a failure of the process seal, the process medium is conducted via the fluidic path network from the sealing plane in the process seal to at least one leakage opening that is externally visible in the installed state of the pressure measuring unit, wherein the webs are designed in such a way that a sum of the individual cross-sections of the several openings corresponds to a pre-specified minimum cross-section, wherein the defined height and the defined width are used to calculate the individual cross-sections, and wherein the webs are, as a function of the characteristics of the process seal, designed in such a way that the process seal does not extrude into the openings.

2. The pressure measuring unit according to claim 1, wherein the webs are designed such that the defined height does not exceed a gap dimension pre-specified for the process seal.

3. The pressure measuring unit according to claim 2, wherein the webs are designed such that the defined height is less than 0.20 mm.

4. The pressure measuring unit according to claim 1, wherein the webs are set back radially from the process seal so that an edge, directed towards the process seal, of the webs has no contact with the not-yet-extruded process seal in the installed state.

5. The pressure measuring unit according to claim 1, wherein an outer lateral surface of the sensor bushing in a lower partial region, which in the installed state is adjacent to an inner lateral surface of the process connector, and/or the inner lateral surface of the process connector in a lower partial region, which in the installed state is adjacent to a, or the, outer lateral surface of the lower partial region of the sensor bushing, has or have several vertical recesses, wherein the several vertical recesses are designed such that the cross-sectional sum of the individual cross-sections of the several vertical recesses corresponds to the pre-specified minimum cross-section.

6. The pressure measuring unit according to claim 5, wherein the sensor bushing in the lower partial region and/or the process connector in the lower partial region has or have at least one circumferential collecting groove for collecting the process medium supplied via the several openings, wherein the at least one collecting groove is designed such that a cross-section of the collecting groove corresponds to the pre-specified minimum cross-section.

7. The pressure measuring unit according to claim 1, wherein the sensor bushing has a circumferential shoulder ring up to which, in the installed state, the sensor bushing is inserted into the opening of the process connector, and wherein the sensor bushing has a further circumferential collecting groove, which is directly adjacent to the shoulder ring, and which is designed to conduct the process medium to the at least one externally visible leakage opening, wherein the further collecting groove is designed such that a cross-section of the further collecting groove corresponds to the pre-specified minimum cross-section.

8. The pressure measuring unit according to claim 1, wherein the at least one externally visible leakage opening is designed such that a cross-section or a cross-sectional sum corresponds to the pre-specified minimum cross-section.

9. The pressure measuring unit according to claim 8, wherein the at least one externally visible leakage opening is or are formed on a rear side of the process connector on which the shoulder ring of the sensor bushing is seated in the installed state.

10. The pressure measuring unit according to claim 1, wherein the pre-specified minimum cross-section corresponds to a pre-specification of a standard relating to hygiene of the European Hygienic Equipment Design Group and/or 3-A, the standard 74-07 of 3-A, published in March 2019.

* * * * *